CHARLES LAUBY.
Hot Water Reservoir for Stove Pipes.
No. 123,489. Patented Feb. 6, 1872.
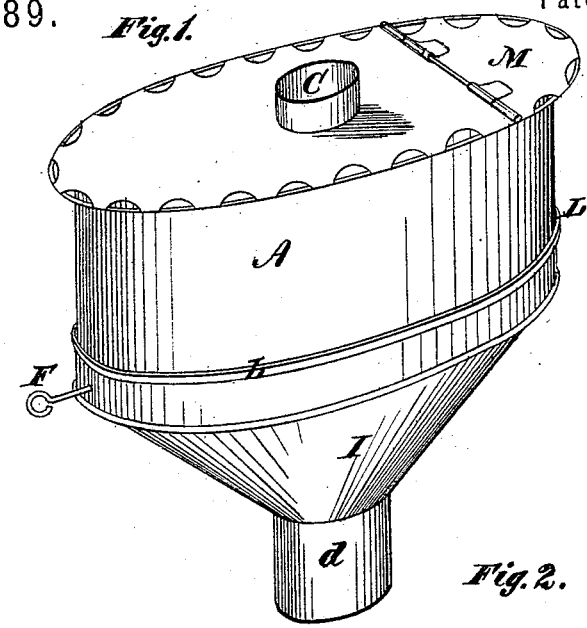
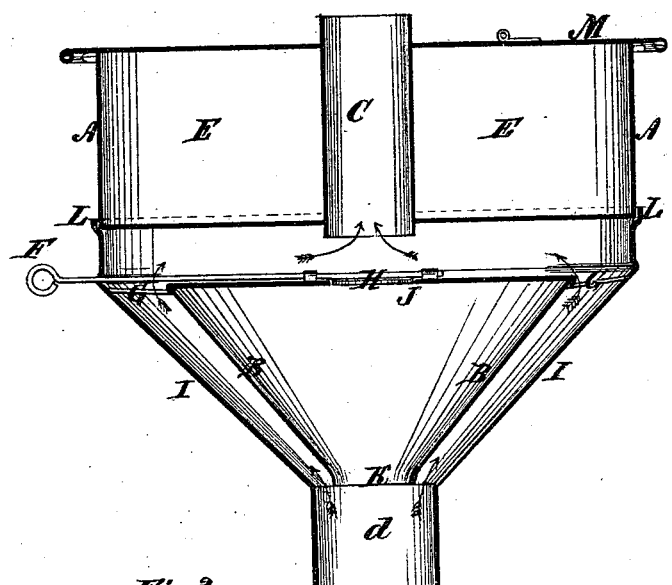
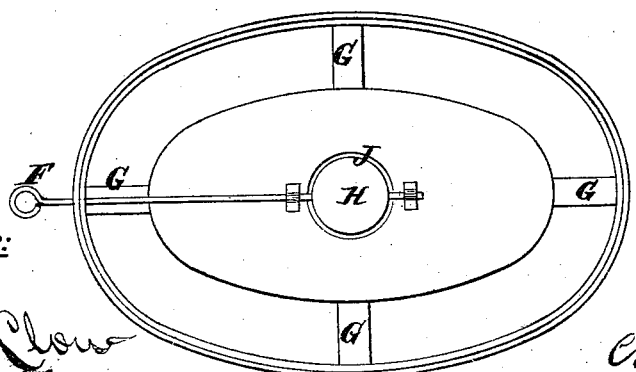
Witnesses: Daniel Clow, Oscar F. Stafford
Inventor: Charles Lauby 123,489

UNITED STATES PATENT OFFICE.

CHARLES LAUBY, OF BRODHEAD, WISCONSIN.

IMPROVEMENT IN HOT-WATER RESERVOIRS FOR STOVE-PIPES.

Specification forming part of Letters Patent No. 123,489, dated February 6, 1872.

SPECIFICATION.

I, CHARLES LAUBY, of Brodhead, in the county of Green and State of Wisconsin, have invented certain Improvements in Hot-Water Reservoirs and Stove-Pipe Drums or Heat-Radiators, of which the following is a specification:

My invention relates to the combination of hot-water reservoirs and stove-pipe drums or heat-radiators, in such a manner that the said radiator shall be capable of distributing its heat equally all over the bottom of the said reservoir, and thence escaping through a pipe in the middle or center thereof.

Figure 1 is a perspective view of the said apparatus embodying my invention. Fig. 2 is a longitudinal vertical section, showing the internal construction of the whole apparatus, and the way that the heat is distributed to accomplish the object desired. Fig. 3 is a plan of the said heater.

A is the reservoir; C is a pipe vertically inserted in the center thereof, through which the smoke and heat escape; E is the chamber thereof, which contains the water. Now, this reservoir is constructed separately and independently of the said heater, and the two are loosely coupled at L—the one inserted into the other after the manner of stove-pipe connections. The said drum or heat radiator is constructed in a conical form with the small end downward, with a short pipe, $d$, at the end. I I is the outer wall or frame of the said drum or heat radiator. B is the inner wall of the same; shaped like the outer, with apertures J and K in the top and bottom thereof. H is a damper located and arranged in the said aperture J, for the purpose of changing the draught to and from the direction of the arrows; for it is obvious that when the said damper is closed the heat will follow in the direction of the said arrows, in the open space between the outer and the inner walls of the said drum, and between the top thereof and the bottom of the said reservoir, as is indicated by the said arrows and shown in Fig. 2. F is a handle attached to the said damper to change its position, or to open and close it. When open, the draught is changed to a vertical line through the said apertures J and K, and thence through the said pipe C in the said reservoirs. G G G G are arms connecting the inner with the outer wall of the said drum, as seen in Fig. 3. M is a lid in the top of the said reservoir.

Claim.

I claim as my invention—

The combination of the said reservoir A and the said drum or radiator, when constructed and arranged substantially as described, and for the purpose set forth.

CHARLES LAUBY.

Witnesses:
DANIEL CLOW,
R. W. KING.